United States Patent [19]

Seimiya

[11] 4,327,066
[45] Apr. 27, 1982

[54] METHOD OF PREPARING SILICON CARBIDE

[75] Inventor: Motoo Seimiya, Yokosuka, Japan

[73] Assignee: Tokyo Shibaura Denki Kabushiki Kaisha, Kawasaki, Japan

[21] Appl. No.: 162,819

[22] Filed: Jun. 25, 1980

[30] Foreign Application Priority Data

Nov. 14, 1979 [JP] Japan ................................ 54/146498

[51] Int. Cl.$^3$ ............................................ C01B 31/36
[52] U.S. Cl. .................................................... 423/345
[58] Field of Search ........................................ 423/345

[56] References Cited

U.S. PATENT DOCUMENTS 3,368,871  2/1968  O'Connor et al. .................. 423/345

FOREIGN PATENT DOCUMENTS 1283813 11/1968  Fed. Rep. of Germany ...... 423/345
1280649  7/1972  United Kingdom ................ 423/345
 186408 11/1966  U.S.S.R. .............................. 423/345

OTHER PUBLICATIONS

Materials Science Research, vol. 11–Hoch et al., "Ultra Fine Powders of Oxides & Non Oxides Ceramic Materials & their Sinterability", pp. 33–40.

Primary Examiner—Jack Cooper
Attorney, Agent, or Firm—Oblon, Fisher, Spivak, McClelland & Maier

[57] ABSTRACT

A method of producing silicon carbide which comprises heating silica in a gas atmosphere comprising hydrocarbon gas and hydrogen gas.

11 Claims, No Drawings

METHOD OF PREPARING SILICON CARBIDE

BACKGROUND OF THE INVENTION

1. Field of the Invention:

The present invention relates to a method of preparing silicon carbide from silica.

2. Description of the Prior Art:

Silicon carbide has been prepared by the reaction of carbon powder and silica by current pass heating. In this method, the heating temperature is about 1900° C. which is very high. Therefore, vaporization of silica occurs. Consequently, the amount of silicon carbide recovered is relatively low. Further, this reaction is a solid phase reaction and requires a long reaction time.

A need exists for a process of producing silicon carbide at high yields with short reaction times.

SUMMARY OF THE INVENTION

Accordingly, it is an object of the present invention to provide a method of preparing silicon carbide in a short period of time.

It is another object of the present invention to provide a method of preparing silicon carbide at low temperatures.

Yet another object of the present invention is to provide a method of preparing high yields of silicon carbide.

These and other objects have now been attained in the present invention by heating silica in a gas atmosphere comprising hydrocarbon gas and hydrogen gas.

DETAILED DESCRIPTION OF THE PREFERRED EMBODIMENTS

Silicon carbide is prepared by heating silica in a gas atmosphere comprising hydrocarbon gas and hydrogen gas. The silica is reduced by the gas atmosphere.

In order to minimize the reaction time, it is advantageous to use finely divided silica. The use of finely divided silica is not, however, critical if longer reaction times are acceptable. The use of finely divided silica increases the surface area in contact with the gas phase which reduces the reaction time. Preferably, the mean particle size of the silica is below 1 micron. More preferably, the mean particle size of the silica is below 0.1 micron. Most preferably, the mean particle size of the silica is between 0.01 and 0.05 micron. Commercial silica may be used, additionally, granulated silica is also a suitable starting material.

The gas atmosphere must contain at least one component which is capable of reacting with silica to produce silicon carbide. Suitable for this purpose are hydrocarbons which are gaseous under the reaction conditions, especially the lower paraffinic hydrocarbons having from 1 to about 7 carbon atoms. Most preferably, the lower paraffinic hydrocarbons are methane, ethane, propane or mixtures thereof. The hydrocarbon gas reduces the silica to silicon carbide. Hydrogen gas prevents cracking of the hydrocarbon. Therefore, it is preferable to use a gas mixture comprising hydrocarbon and hydrogen.

The ratio of hydrocarbon and hydrogen in the gas affects the efficiency of the process for the production of silicon carbide. Preferably, the volume ratio of $H_2/CH_4$ is between 1 and 100. More preferably, the ratio is between 5 and 50. When hydrocarbons other than methane are present, the hydrocarbon content should be converted into its methane equivalent based on carbon content.

Additionally, a diluent gas may be used. Preferable diluent gases are inert gases, for instance nitrogen or argon. Preferably, the volume ratio of diluent gas/hydrocarbon is between 0.1 and 50.

The reaction temperature is typically from 1200° C. to 1600° C.; more preferable, 1350° C. to 1500° C. Where the reaction temperature is too low, the reaction will progress too slowly to be of practical value. Where the reaction temperature is too high, vaporization of silica will occur. Preferably, the reaction time is between 1 to 2 hours at 1600° C. and 4 to 10 hours at 1200° C. However, longer or shorter reaction times may be used.

Silicon carbide powder, obtained by the above reaction, may be heated in an oxidizing atmosphere, for instance air, to remove carbon adhered on the surface of the silicon carbide powder, the temperatures of from about 600° C. to 1000° C. are suitable.

Having generally described this invention, a further understanding can be obtained by reference to certain specific examples which are provided herein for purposes of illustration only and are not intended to be limiting unless otherwise specified.

EXAMPLES

The results of Examples 1–4 are tabulated in the table following Example 4.

EXAMPLE 1

1. Silica raw material; Vitasil #1500 (manufactured by Taki Chemical Company of Japan, mean particle size of 0.018 micron and a surface area of 180 to 230 $m^2/g$).
2. Silica temperature; 1400° C.
3. Volume of silica charged; 8 g.
4. Boat volume to be filled with silica; 20 cc.
5. Boat material; carbon.
6. Gas atmosphere; $CH_4$, 15 l/hr; $H_2$, 600 l/hr; and $N_2$, 15 l/hr.
7. Heating temperature; 1400° C.
8. Heating time; 3 hours.
9. Additional heating condition to remove adhered carbon; 800° C. for 2 hours in air.

EXAMPLE 2

1. Silica raw material; Vitasil #550 (manufactured by Taki Chemical Company of Japan, mean particle size of 0.025 micron and a surface area of 250 to 300 $m^2/g$).
2. Gas atmosphere; $CH_4$, 15 l/hr; and $H_2$, 600 l/hr.
3. Heating temperature; 1410° C.
4. Heating time; 3 hours.
5. Other conditions identical to those of Example 1.

EXAMPLE 3

1. Silica raw material; Aerosil OX-50 (manufactured by Degussa Company of Federal Republic of Germany, mean particle size of 0.04 micron and surface area of 50 $m^2/g$).
2. Gas atmosphere; $CH_4$, 15 l/hr; $H_2$, 600 l/hr; and $N_2$, 30 l/hr.
3. Heating temperature; 1400° C.
4. Heating time; 5 hours.
5. Other conditions identical to those of Example 1.

EXAMPLE 4

1. Silica raw material; Silica-gel (surface area of 820 m$^2$/g).
2. Gas atmosphere; CH$_4$, 15 l/hr; and H$_2$, 600 l/hr.
3. Heating temperature; 1410° C.
4. Heating time; 5 hours.
5. Other conditions identical to those of Example 1.

TABLE 1

| Example | Phases Detected by X-ray Diffraction Analysis | | | | Chemical Analysis |
|---|---|---|---|---|---|
| | β-SiC | Si | SiO$_2$ | Si$_3$N$_4$ | O |
| 1 | 98 wt. % | ND* | 1 wt. % | 1 wt. % | 0.8 wt. % |
| 2 | 99.5 wt. % | ND | 0.5 wt. % | ND | 0.5 wt. % |
| 3 | 98.5 wt. % | ND | 1 wt. % | 0.5 wt. % | 1.1 wt. % |
| 4 | 98 wt. % | ND | 2 wt. % | ND | 1.5 wt. % |

*ND: not detectable

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A method of producing β-silicon carbide which comprises heating solid silica in a gas atmosphere consisting essentially of a gas feed of hydrocarbon gas and hydrogen gas wherein the silica is heated to a temperature of 1200° C. to 1600° C. and the volume ratio of hydrogen (H$_2$)/hydrocarbon (methane equivalent) is between 1 and 100.

2. A method of producing β-silicon carbide which comprises heating solid silica in a gas atmosphere consisting essentially of a gas feed of hydrocarbon gas, hydrogen gas and a diluent gas, wherein the volume ratio of diluent gas/hydrocarbon is between 0.1 and 50, wherein the silica is heated to a temperature of 1200° C. to 1600° C. and the volume ratio of hydrogen (H$_2$)/hydrocarbon (methane equivalent) is between 1 and 100.

3. The method of claim 1 or 2, wherein the silica is heated to a temperature of 1350° C. to 1500° C.

4. The method of claim 1 or 2, wherein said hydrocarbon gas is a lower paraffinic hydrocarbon.

5. The method of claim 2, wherein said diluent gas is an inert gas.

6. The method of claim 5, wherein said inert gas is nitrogen.

7. The method of claim 5, wherein said inert gas is argon.

8. The method of claim 1 or 2, wherein the volume ratio of hydrogen (H$_2$)/hydrocarbon (methane equivalent) is between 5 and 50.

9. The method of claim 1 or 2, wherein the mean particle size of said silica is below about 0.1 micron.

10. The method of claim 1 or 2, wherein the mean particle size of said silica is between 0.01 and 0.05 micron.

11. The method of claim 1 or 2, wherein the silicon carbide powder produced is heated in an oxidizing atmosphere to remove carbon adhered to the surface of said silicon carbide powder.

* * * * *